Patented July 15, 1941

2,248,954

UNITED STATES PATENT OFFICE 2,248,954

PROCESS FOR THE MANUFACTURE OF α,β-UNSATURATED KETONES OF THE CYCLOPENTANO POLYHYDRO PHENANTHRENE SERIES

Adolf Butenandt, Berlin-Lichterfelde, Germany, assignor to Schering Corporation, Bloomfield, N. J., a corporation of New Jersey No Drawing. Application March 26, 1937, Serial No. 133,204. In Germany March 31, 1936

16 Claims. (Cl. 260—397.3)

This invention relates to a process for the manufacture of α,β-unsaturated ketones of the cyclopentano polyhydro phenanthrene series of the general formula $C_{19}H_{26}O(X)$ and the constitutional formula:

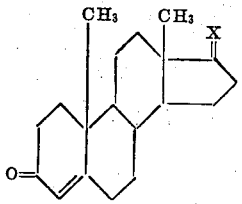

in which X indicates

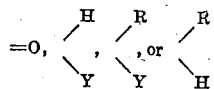

Y being a hydroxyl group or a group convertible into the hydroxyl group by hydrolysis, as, for example, an ester or ether group or the like and R indicates any suitable substituted or non-substituted hydrocarbon residue. In particular there is involved in the present invention a process for the manufacture of α,β-unsaturated ketones of the androstane series, the pregnane series and also the sterol and bile acid series.

The process of manufacture according to the invention consists in that the β,γ-unsaturated ketones of the cyclopentano polyhydro phenanthrene series of the same general formula $C_{19}H_{26}O(X)$ and the constitutional formula:

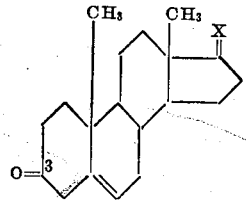

X having the above signification, are subjected to a treatment which has for its effect the displacement of a carbon-carbon double bond in β,γ-unsaturated ketones.

The reagents and reaction conditions suitable for the production of such an intramolecular rearrangement are described among others in Houben-Weyl, Methoden der organischen Chemie, vol. 2, 2nd edition (1922), page 470 et seq. and page 756 et seq.

Thus, it is easily possible, for example, to convert the β,γ-unsaturated ketones into the corresponding α,β-unsaturated ketones when they are gently heated for a short time in acid or alkaline solution, say in alcohol with the addition of dilute mineral acid or dilute alkali lye; on working up the reaction solution there is then obtained directly in practically quantitative yield the rearranged α,β-unsaturated ketone.

It is also possible, however, for the purpose of displacement of the carbon-carbon double bond to proceed in such a manner that in the first place halogen hydride, for example, hydrogen chloride is added on to the β,γ-unsaturated ketones and then from the addition product formed, by treatment of the same with alkaline reacting agents halogen hydride again split off.

In a similar manner from β,γ-unsaturated ketones likewise the corresponding α,β-unsaturated keytones are obtained when there is added on to the β,γ-unsaturated ketones halogen, for example, bromine, and then from the dihalogen compound formed the halogen again split off by means of zinc or the like in an acid medium.

Also the heating of the β,γ-unsaturated ketones with or without solvents to elevated temperatures, for example, to their melting point, leads to the isomerisation.

Further as contact substances finely divided metals or metal compounds, as, for example, nickel, platinum, aluminium oxide and the like can be employed for the intramolecular rearrangement of β,γ-unsaturated ketones to α,β-unsaturated ketones.

The β,γ-unsaturated ketones of the cyclopentano polyhydro phenanthrene series coming into consideration for the present isomerisation process can be produced in any suitable manner. One method of manufacture of such β,γ-unsaturated ketones consists, for example, in that the corresponding dihalogen compounds of the ketones, in particular the dibromo compounds, are dehalogenated by short heating with zinc dust in ethanol or methanol, that is to say therefore in a neutral medium as is described in specification Serial No. 132,954.

The α,β-unsaturated ketones of the cyclopentano polyhydro phenanthrene series obtainable according to the present process constitute valuable compounds; they are either themselves physiologically active or can be worked up to physiologically active substances. In so far as they are themselves physiologically active they in general exhibit a higher activity than the corresponding starting materials. This is true in particular for the $\Delta_{4,5}$-pregnendione-(3.20), which is obtained according to the present process from the $\Delta_{5,6}$-pregnendione-(3.20); whereas in fact the Δ5,6-pregnendione-(3.20) in the test on infantile rabbits according to the method given by Butenandt, Westphal and Hohlweg (c. f. Z. physiol. Chemie, 227, 87 (1934)) gives no indication of physiological activity, the Δ4,5-pregnendione-(3.20) has proved identical with the highly active progesterone which can be isolated from corpora lutea.

The following examples illustrate the invention without, however, limiting the same to them:

Example 1

26 mg. of Δ5-cholestenone-(3) are dissolved in 3.5 ccs. of methanol, treated with 3 drops of 4 N sulphuric acid (about 0.05 ccs.) and heated on the water bath for 5 minutes, the solution at the same time being evaporated to about one half. On cooling the Δ4-cholestenone-(3) crystallises in long needles of melting point 80° C. The yield amounts to 20 mg.

Instead of methanol also ethanol or glacial acetic acid with a few drops of mineral acid, for example, dilute sulphuric acid, hydrochloric or hydrobromic acid and the like can be employed.

Example 2

10 mg. of Δ5-cholestenone-(3) are dissolved in 0.5 ccs. of ethanol with the addition of 2 drops of 2 N caustic soda lye; the solution which becomes yellow colored after the addition of the caustic soda lye is heated for 5 minutes on the water bath and thereupon after cooling carefully sprayed with water. In a yield of 8 mg. is then obtained the Δ4-cholestenone-(3) in the form of long needles of melting point 80° C.

Example 3

3.8 mg. of Δ5-pregnendione-(3.20) are dissolved in the hot in the smallest quantity of alcohol and after the addition of 1 drop of about $$n/1$$

alcoholic aqueous sulphuric acid, heated for 6 minutes on the water bath. After cooling cold water is introduced to the commencement of turbidiffication and the solution seeded with Δ4-pregnendione-(3.20) in the form of the so-called β-progesterone of melting point 121° C. There are then obtained in a yield of 3.4 mg. the characteristic long needles of β-progesterone of melting point 121° C.

The needle shaped crystal modification of the Δ4-pregnendione-(3.20) obtained can be converted by dissolving in hot alcohol, spraying with hot water and seeding with Δ4-pregnendione-(3.20) in the form of the so-called α-progesterone of melting point 128.5° C., into the prism shaped crystal modification of melting point 128.5° C. On taking a mixed melting point of the so-called Δ4-pregnendione-(3.20) with the natural α-progesterone isolated from corpera lutea no lowering of the melting point of 128.5° C. takes place.

Example 4

5.25 mg. of pure Δ5-pregnendione-(3.20) of melting point 158 to 160° C. are heated for about 8 minutes to 160° C. There is obtained a slightly yellow-colored product, which compared with the specific rotation of the starting material of $$[\alpha]_D^{20°} = +65.5°$$

in chloroform exhibits an increase of the rotation value to $$[\alpha]_D^{20°} = +114°$$

thereby indicating the formation of Δ4-pregnendione-(3.20) with the specific rotation $$[\alpha]_D^{20°} = +194°$$

Example 5

21 mg. of Δ5-androstendione-(3.17) are dissolved in 1 cc. of glacial acetic acid and after the addition of 1 drop of 48% hydrobromic acid heated on the water bath for 10 minutes. The slightly brown-colored solution is carefully sprayed with water and seeded with Δ4-androstendione-(3.17). 12 mg. are obtained of Δ4-androstendione-(3.17), which after recrystallisation from dilute acetone is obtained in the form of needles and exhibits a melting point of 169 to 170° C.

Example 6

30 mg. of Δ5-17-ethyl-androstenol-(17)-one-(3) of melting point 149° C. are dissolved in 0.5 ccs. of alcohol and heated for 5 minutes on the water bath with the addition of 1 drop of 4 N sulphuric acid. Thereupon the solution is carefully sprayed with water in the cold; slowly well formed leaflets crystallise of M. P. 136° C. which apparently contain water of crystallisation. On recrystallisation of these crystals from petrol ether of boiling point 70–80° C. the melting point increases to 139° C. On the basis of the analysis values the Δ4-ethyl-androstenol-(17)one-(3) in this form is present in pure, anhydrous condition.

The Δ4-ethyl-androstenol-(17)-one-(3) yields on reaction with semicarbazide acetate in alcoholic solution a semicarbazone which after recrystallisation from dilute methanol exhibits a melting point of 230° C. with decomposition.

Example 7

32 mg. of Δ5-cholestenone-(3) in 4 ccs. of glacial acetic acid are treated with an equimolecular quantity of bromine. From the solution which soon becomes decolorised, by the addition of water the 5.6-dibromo-cholestenone formed is precipitated; it exhibits after recrystallisation from acetone a melting point of 80° C.

20 mg. of 5.6-dibromo-cholestenone are dissolved in 3 ccs. of methanol and after the addition of 4 drops of a 5 N sulphuric acid heated with 20 mg. of zinc dust for 10 minutes with shaking on the water bath. From the solution filtered from zinc dust is obtained on evaporation in a yield of 15 mg. the Δ4,5-cholestenone-(3) of melting point 80° C.

The same result is also obtained by debromination with zinc in acidified ethanol.

Example 8

3.2 mg. of Δ5-pregnendione-(3.20) are dissolved in 2 ccs. of absolute alcohol with the addition of 2 drops of an about 10 N aqueous sulphuric acid and left to stand for 10 minutes without heating. Thereupon the reaction solution is treated with water and extracted with ether; from the ethereal solution washed free from acid are then obtained about 2 mg. of Δ4-pregnendione-(3.20) of melting point 128° C.

Example 9

10 mg. of Δ5-androstenol-(17)-one-3-acetate are dissolved in 2 ccs. of methanol, treated with 2 drops of 5 N hydrochloric acid and sprayed with warm water. There crystallise long needles of M. P. 138° C. A mixed melting point test with testosterone acetate gave no depression.

Of course, many changes and variations in the reaction conditions and the like may be made by those skilled in the art in accordance with the principles set forth herein and in the claims annexed hereto.

What I claim is:

1. Process for the manufacture of α-β-unsaturated ketones of the cyclopentano polyhydro phenanthrene series, wherein β-γ-unsaturated ketones of the cyclopentano polyhydro phenanthrene series of the general formula $C_{19}H_{26}O(X)$ and the constitutional formula

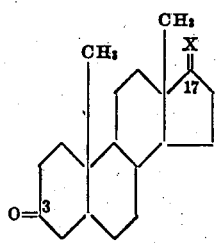

in which X indicates a member of the group consisting of

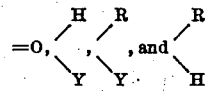

Y being a member of the group consisting of the hydroxyl group and groups replaceable by the hydroxyl group with the aid of hydrolysis, and R being a member of the group consisting of hydrocarbon radicals and oxygenated hydrocarbon radicals, are subjected to an agency capable of effecting displacement of a carbon-carbon double bond in β-γ-unsaturated ketones to cause shifting of the double bond to the α,β-position.

2. Process as claimed in claim 1, in which the displacement of the carbon-carbon double bond in the β.γ-unsaturated ketone serving as starting material is effected by means of acids.

3. Process as claimed in claim 1, in which the displacement of the carbon-carbon double bond in the β.γ-unsaturated ketone serving as starting material is effected by means of bases.

4. Process as claimed in claim 1, in which the displacement of the carbon-carbon double bond in the β.γ-unsaturated ketone serving as starting material is effected by heating the same with or without solvent.

5. Process as claimed in claim 1, in which as starting material a Δ5-pregnendione-(3.20) is employed.

6. Process for the manufacture of α.β-unsaturated ketones of the cyclopentano polyhydro phenanthrene series, which comprises treating a Δ5-pregnendione-(3,20) with an acid to effect displacement of the carbon-carbon double bond.

7. Process for the manufacture of α.β-unsaturated ketones of the cyclopentano polyhydro phenanthrene series, which comprises treating a Δ5-pregnendione-(3,20) with a base to effect displacement of the carbon-carbon double bond.

8. Process for the manufacture of α.β-unsaturated ketones of the cyclopentano polyhydro phenanthrene series, which comprises heating a Δ5-pregnendione-(3,20) to elevated temperatures until displacement of the carbon-carbon double bond is effected.

9. Process for the manufacture of α-β-unsaturated ketones of the cyclopentano polyhydro phenanthrene series comprising subjecting a $\Delta_{5,6}$-3-keto-10,13-dimethyl cyclopentano polyhydro phenanthrene compound to the action of an agency capable of effecting displacement of a carbon-carbon double bond in β-γ-unsaturated ketones.

10. Process according to claim 9 wherein the starting material is a $\Delta_{5,6}$-3-keto-pregnene compound.

11. Process according to claim 9 wherein the starting compound is subjected to elevated temperatures in a non-neutral medium until displacement of the double bond is effected.

12. Process for the manufacture of α.β-unsaturated ketones of the cyclopentano polyhydro phenanthrene series, which comprises subjecting a $\Delta^{5,6}$-10,13-dimethyl cyclopentano polyhydro phenanthrene compound having ketonic oxygen directly joined to the 3-carbon and having an oxygenated group at the 17-position, to the action of an agency capable of effecting displacement of the double bond into the 4,5-position.

13. Process according to claim 12, wherein the starting compound is subjected to the action of elevated temperatures until the shifting of the double bond has been effected.

14. Process according to claim 12, wherein the starting compound is subjected to the action of an acid until the shifting of the double bond has been effected.

15. Process according to claim 12, wherein the starting compound is subjected to the action of a base until the shifting of the double bond has been effected.

16. Process for the manufacture of α.β-unsaturated ketones of the cyclopentano polyhydro phenanthrene series, which comprises subjecting a $\Delta^{5,6}$-10,13-dimethyl cyclopentano polyhydro phenanthrene compound having ketonic oxygen directly joined to the 3-carbon and having a ketonic group at the 17-position, to the action of an agency capable of effecting displacement of the double bond into the 4,5-position.

ADOLF BUTENANDT.